United States Patent [19]

Umeda

[11] 4,160,639
[45] Jul. 10, 1979

[54] MANUFACTURING PROCESS AND STRAIGHTENING JIG FOR HOLLOW TAPERED RODS

[76] Inventor: Toyoji Umeda, c/o Daiwa Seiko Kabushiki Kaisha, 14-16, 3-chome, Maesawa, Higashi Kurume-shi, Tokyo, Japan

[21] Appl. No.: 913,173

[22] Filed: Jun. 6, 1978

[30] Foreign Application Priority Data

Dec. 29, 1977 [JP] Japan ................................ 52-158171

[51] Int. Cl.² ........................ B29C 17/02; B29C 25/00
[52] U.S. Cl. .................................... 425/383; 100/211; 100/295; 249/114 R; 425/470; 425/DIG. 44
[58] Field of Search ............... 156/245, 194, 228, 196, 156/500, 581; 425/383, 392, 384, 393, 394, 395, 434, 363, 340, DIG. 29, 343, DIG. 44; 43/18 GF, 18 R; 249/114; 100/295, 211; 264/325

[56] References Cited

U.S. PATENT DOCUMENTS

| 306,701 | 10/1884 | Spitzenberg | 43/18 GF |
| 665,989 | 1/1901 | Bechtold | 156/245 |
| 1,323,039 | 11/1919 | Frederick | 43/18 GF |
| 2,377,335 | 6/1945 | Finlayson et al. | 43/18 GF |
| 2,684,318 | 7/1954 | Meek | 43/18 GF |
| 3,173,974 | 3/1965 | Mohr | 425/DIG. 44 |
| 3,896,206 | 7/1975 | Beaver et al. | 264/325 |

Primary Examiner—W. E. Hoag
Attorney, Agent, or Firm—C. Bruce Hamburg

[57] ABSTRACT

Manufacturing process and straightening jig for a hollow tapered rod characterized in that in mid-process of curing the resin in a fiber-reinforced resin-impregnated sheet wound around a mandrel, the mandrel is pulled out of the wound sheet in a semi-cured state or the mandrel is pulled out and again thrust into the wound sheet; then the wound sheet with the mandrel pulled out or the wound sheet with the mandrel reinserted is placed on a straightening jig and left there until the curing is completed.

9 Claims, 19 Drawing Figures

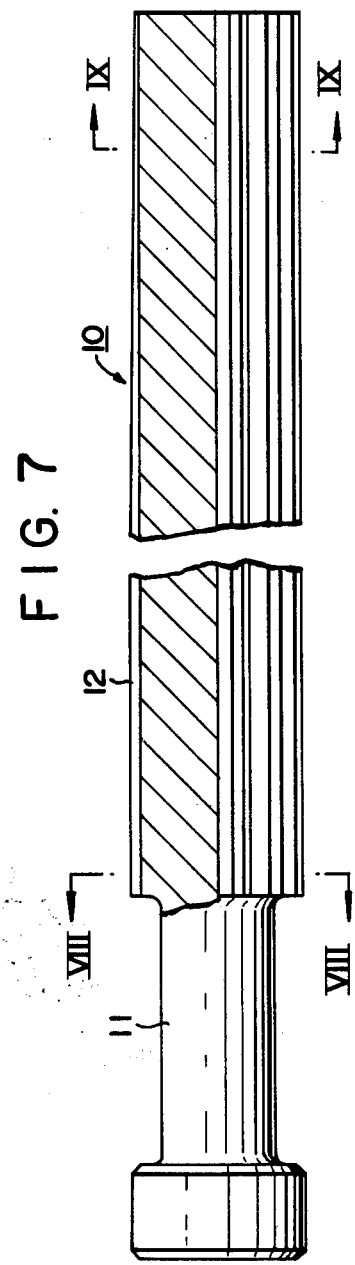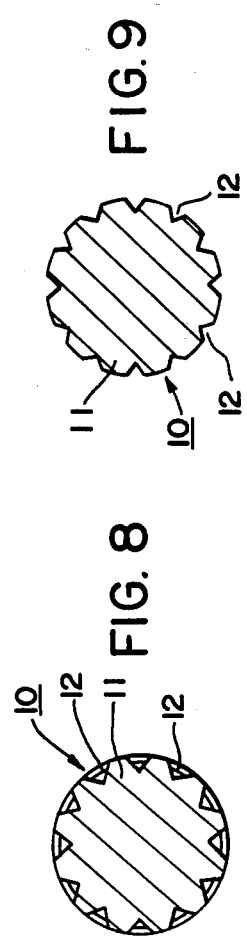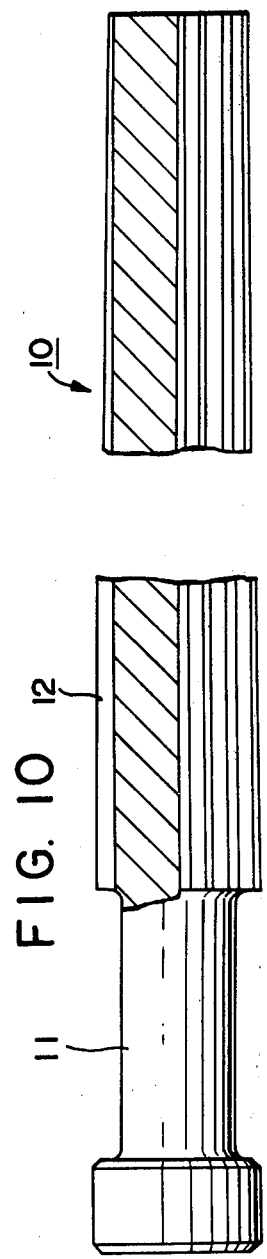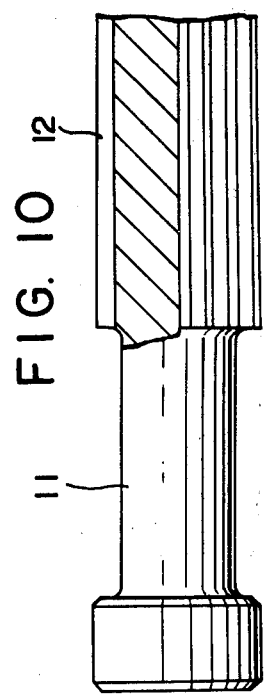

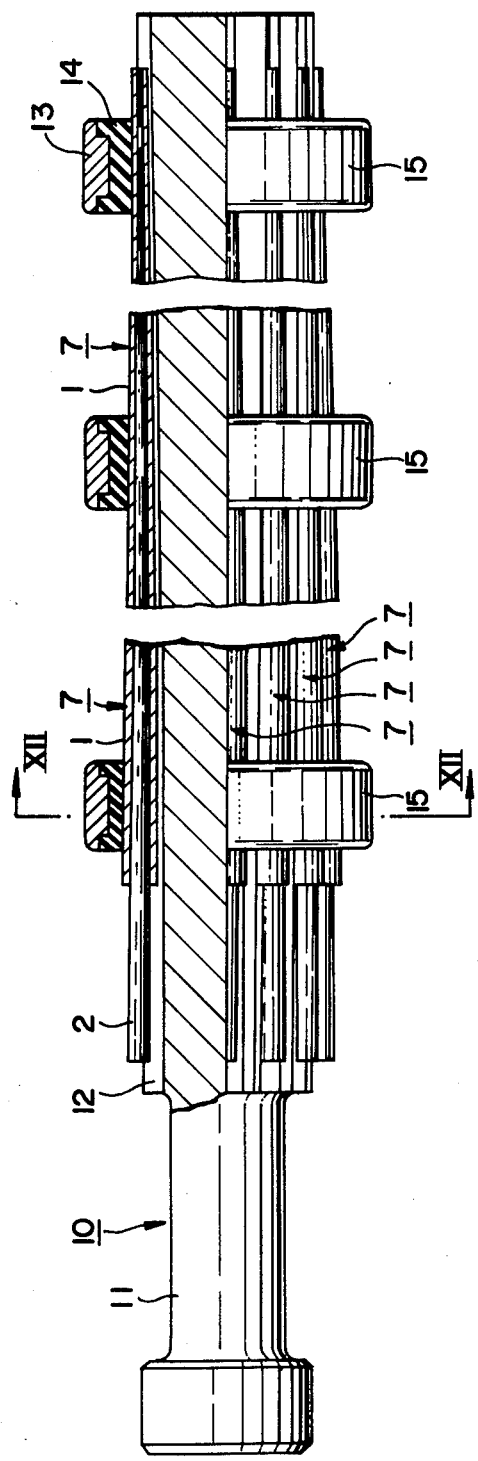

FIG. 15
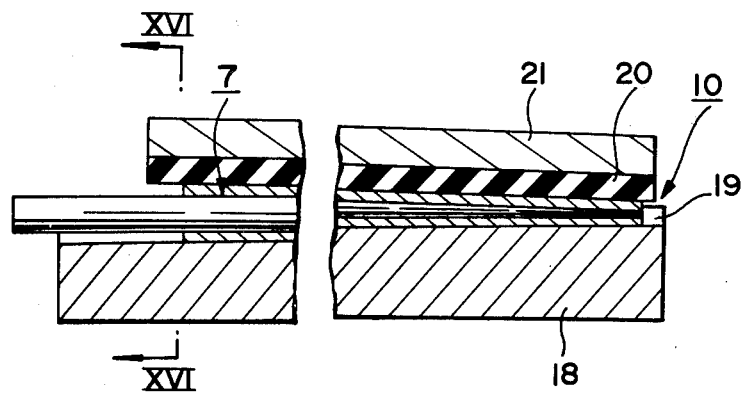
FIG. 16
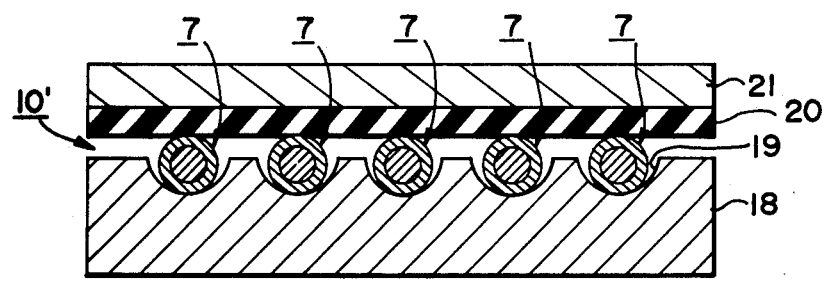
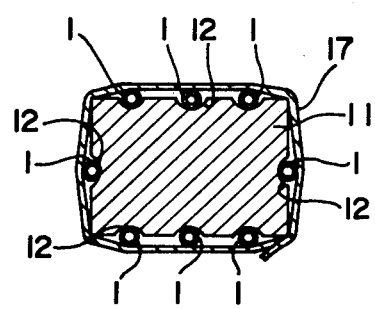
FIG. 17

MANUFACTURING PROCESS AND STRAIGHTENING JIG FOR HOLLOW TAPERED RODS

BACKGROUND OF THE INVENTION

The present invention relates to a manufacturing process and straightening jig for a hollow tapered rod which is to serve, for example, as a fishing rod or a golf club shaft, more specifically to a manufacturing process which can harden a prepreg-sheet wound around a tapered mandrel without bending deformation and to a straightening jig to be used for perfect hardening of the prepreg-sheet.

The conventional process of manufacturing a hollow tapered rod is as follows. A woven cloth is obtained using at least one of glass and carbon fibers, or a unidirectionally oriented sheet is obtained using a bundle of at least one of glass and carbon fibers. A fiber-reinforced sheet is formed by impregnating a single aforementioned cloth or sheet or a superimposed plurality thereof with a solution of at least one thermosetting resin such as epoxy, polyester or phenol, which are non-hardenable at room temperature, yielding a sheet impregnated with semi-dry resin, i.e., a so-called "pre-preg-sheet". The prepreg-sheet is cut to an appropriate size and wound around a tapered iron or alloy mandrel. The wound pre-preg sheet is wrapped with a spiral winding of a cellophane tape or a polyester tape and then placed in an air heating furnace, where it is cured. Finally, after the mandrel is pulled out of the hardened sheet, the wound tape covering the sheet surface is stripped off, yielding a hollow tapered rod.

In the above-mentioned conventional manufacturing process, however, the finished hollow tapered rod is liable to develop an arcuate, convoluted or spiral bend or some combination thereof. These bending deformations are supposedly caused as follows:

(1) The number of layers of windings of prepreg-sheets on the tapered mandrel should be uniform, but in the practical process of mass production it is very difficult to have the start and end of the layers in perfect alignment; in some cases, part of the rod has one more or one less layer than specified because the spiral winding is, respectively, too long or too short. Thus, an arcuate or convoluted bend appears due to local variation in the contracting rate of the reinforcing fibers.

(2) Since the fibers in the prepreg-sheet run spirally to the mandrel, the fibers contract spirally, resulting in a spiral bending of the sheet.

(3) A spiral tape externally covers the prepreg-sheet. Accordingly, with a force acting spirally on the sheet surface, a spiral bending of the sheet develops.

(4) For winding a prepreg-sheet around the mandrel, the start of the sheet cut to an appropriate shape is placed on the mandrel and by applying a hot iron, the resin in the start of the sheet is adhered to the mandrel and thereafter the sheet is wound around the mandrel in several layers. Thereby the phenomenon in paragraph (3) occurs most frequently in the outermost layer of sheet. Meanwhile, with the start of the innermost layer adhered to the mandrel, a difference develops in the degree and direction of tension in reinforcing fibers between the outer and inner layers, thereby causing a compound bending of the sheet.

(5) When the resin is heated and becomes temporarily fluid, a natural balancing takes place between the reinforcing fibers, but this balancing is confined to the intermediate layers which are freer than the outer or inner layers with the result that a general balance cannot be attained.

(6) When carbon fibers are used for reinforcement, the bending of the sheet is aggravated because the tensile strength of carbon fibers is far greater than that of glass fibers.

For these reasons, the bending tendency is the greater, the smaller the diameter of the forward or near-forward section in a multi-sectioned fishing rod. Rods of carbon fibers are found superior as fishing rods or golf club shafts, but their mass production is impossible on account of considerable deformations liable to happen in their manufacture, resulting in their high prices.

Moreover, when the diameter of the mandrel is small, a deformation of the wound sheet causes a deformation of the mandrel, making it impossible to pull out the mandrel.

SUMMARY OF THE INVENTION

The primary object of the present invention is to provide a mass-production process for a hollow tapered rod without bending deformation.

Another object of the present invention is to provide a mass-production process for a fine-diameter hollow tapered rod to be used as the forward section of a multi-sectioned fishing rod, without bending deformation.

Still another object of the present invention is to provide a mass-production process for a carbon fiber-reinforced hollow tapered rod without bending deformation.

Still another object of the present invention is to provide a straightening jig to be used for manufacturing a bend-free hollow tapered rod.

Still another object of the present invention is to provide a straightening jig available for mass production of bend-free hollow tapered rods.

Several other objects of the present invention will become apparent from the following detailed description with reference to the attached drawings.

BRIEF DESCRIPTION OF THE DRAWINGS

FIG. 7 is a partially fragmentary enlarged front view of the body of a straightening jig as used in the present invention.

FIG. 8 is an VIII—VIII section view of FIG. 7.

FIG. 9 is a IX—IX section view of FIG. 7.

FIG. 10 is a partially fragmentary front view illustrating a modified form of the straightening jig of FIG. 7.

FIG. 11 is a partially fragmentary front view illustrating a mandrel-wound sheet assembly as set in the body of the straightening jig of FIG. 7.

FIG. 15 is a longitudinal section view of another embodiment of a straightening jig of the present invention.

FIG. 16 is a XVI—XVI section view of FIG. 15.

FIG. 17 is a cross-section view of yet another embodiment of a straightening jig as used in the present invention.

DETAILED DESCRIPTION OF PREFERRED EMBODIMENTS

Figure 1:
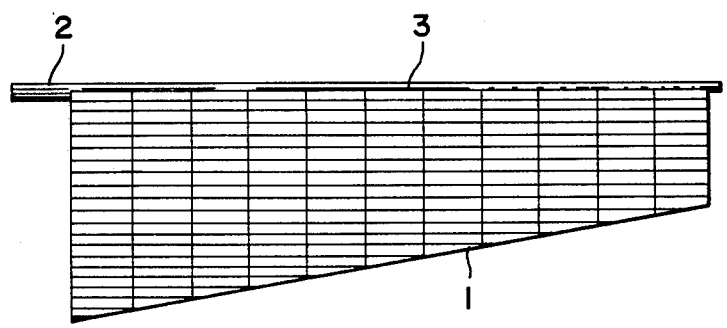
FIG. 1 is a plan view showing the mandrel and the fiber-reinforced resin-impregnated sheet to be used in the present invention.
Figure 2:
FIG. 2 is a plan view illustrating the mandrel as wound with the fiber-reinforced resin-impregnated sheet.

In FIG. 1, 1 is a so-called "prepreg-sheet", which has been defined hereinabove. The prepreg-sheet 1 is cut to an appropriate shape, for instance trapezoidal; and then it is wound around a tapered iron or alloy mandrel 2. Specifically, the start 3 of the prepreg-sheet 1 is pressed against the mandrel 2 with a hot iron, to set it to the mandrel 2; and thereafter the prepreg-sheet 1 is wound around the mandrel 2 in several layers. FIG. 2 shows the prepreg-sheet 1 now wound around the mandrel 2.

Figure 3:
FIG. 3 is a plan view illustrating the mandrel wound with the aforementioned sheet which now is externally covered with a tape.
Figure 4:
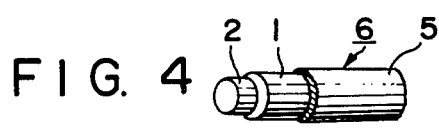
FIG. 4 is a partially fragmentary, enlarged perspective view of the mandrel wound with the aforementioned sheet which now is externally sheathed in a thermo-shrinking tube.

Next, as illustrated in FIG. 3, the mandrel 2 wound with the prepreg-sheet 1 (hereafter referred to as the "wound sheet") is further wound tightly with a tensioned tape 4, for instance cellophane tape; or as illustrated in FIG. 4, the wound sheet 1 is externally sheathed in a thermo-shrinking tube 5. The whole assembly thus produced is called a mandrel-sheet assembly 6. The assembly 6 is put into a heating furnace (not shown) to heat the wound sheet 1, thereby semi-curing the resin therein. What is called "semi-curing" herein refers to the so-called B-stage when the synthetic resin solution used is of an epoxy or phenol resin. In this stage, the assembly 6 is heated at around 80°~140° C. for 60~30 minutes to semi-cure the impregnated resin solution. When the resin used is an unsaturated polyester resin in which the bridging reaction, once started, continues until it completes itself, the semi-cured stage refers to partial completion of this reaction.

Figure 5A:
FIGS. 5A and 5B are axial-section views illustrating the procedure of the mandrel being pulled out of a semi-cured wound sheet.
Figure 5B:
Figure 6A:
FIGS. 6A and 6B are axial-section views illustrating the procedure of a mandrel pulled out of a semi-cured wound sheet being inserted into the sheet.
Figure 6B:
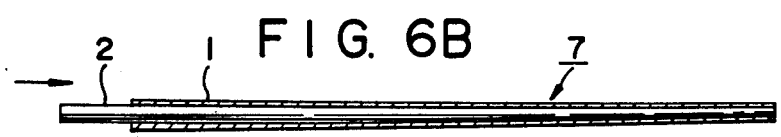
Figure 12:
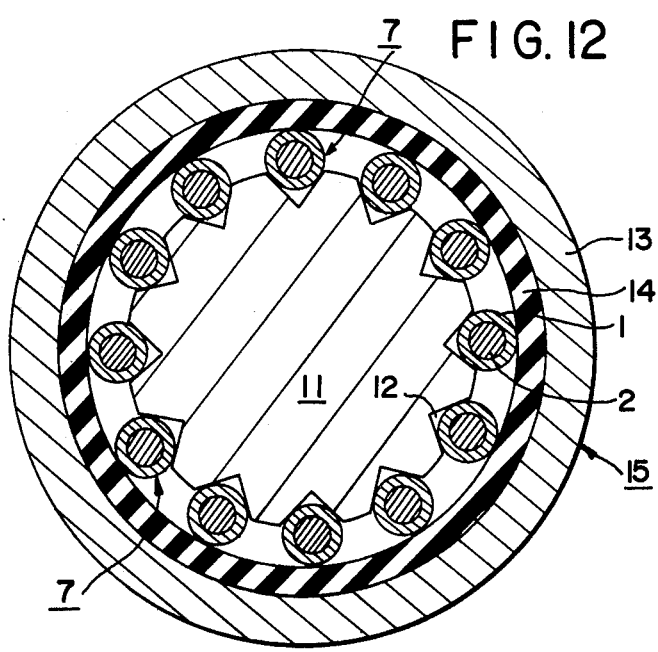
FIG. 12 is an enlarged XII—XII section view of FIG. 11.

As illustrated in FIGS. 5A and 5B, the mandrel 2 is pulled out of the wound sheet 1 in a semi-cured stage. Or as illustrated in FIG. 6A, the mandrel 2 is pulled out of the wound sheet 1 and after thus being once separated from the wound sheet 1 so as to avoid adhering thereof to the wound sheet 1, it is again thrust into the wound sheet 1 as illustrated in FIG. 6B, resulting in a "mandrel-sheet reassembly" 7. The wound sheet 1 without the mandrel 2 or the mandrel-sheet reassembly 7 is attached to a jig, to be described later, for complete hardening of the synthetic resin solution in the wound sheet 1. Complete hardening is attained in the case of epoxy resin or phenol resin by 60~120 minutes of reheating at 130°~180° C. and in the case of unsaturated polyester resin by similar reheating to complete the bridging reaction.

Figure 13:
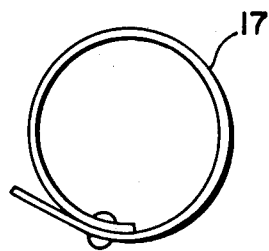
FIG. 13 is a front view illustrating a closed clamping device to be used in the jig of FIG. 11.
Figure 14:
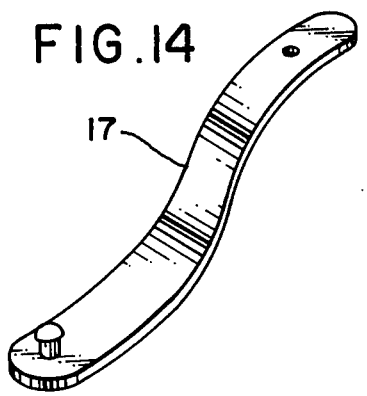
FIG. 14 is a perspective view of the clamping device of FIG. 13 in an open state.

Next the structure of the jig to which the wound sheet 1 or the mandrel-sheet reassembly 7 is attached will be described. As indicated in FIG. 7, the jig 10 consists of a column or body 11 and a plurality of longitudinally extending holding grooves 12 spaced at regular intervals around the periphery of the column 11. As shown in FIGS. 8 and 9, the grooves 12 are V-shaped in section and are inclined upwardly from left to right in FIG. 7. In this exemplary embodiment, the outer diameters of the column 11 are the same at the base and the tip, but the grooves 12 themselves are inclined. The wound sheet 1 or the mandrel-sheet reassembly 7, being in the shape of a tapered rod as a whole, can well fit the inclined surface of the groove 12 when pressed against it. As illustrated in FIG. 11, with each groove 12 receiving a wound sheet 1 or a mandrel-sheet reassembly 7, a plurality of annular clamping rings 15, which are metal rings 13 internally lined with an elastic material 14, such as rubber or an elastomeric synthetic resin, are applied to press and firmly hold the wound sheets 1 or reassemblies 7 in the grooves 12. The shape of the jig body 11 is not restricted to a circular section; it can have a polygonal section as illustrated in FIG. 17. For the purpose of holding the wound sheets 1 or the reassemblies 7 in the grooves 12, anything will do that can serve this function; for instance, the holding means may be a band 17 of heat-resistant elastomeric silicone polymer as shown in FIGS. 13 and 14. When the wound sheets 1 or the reassemblies 7 are cured as fixed in the jig 10 or other jig according to the invention, they are totally free from bending.

In the embodiment illustrated in FIG. 10, the bottoms of the grooves 12 are parallel to the axis of the column 11 but the surface of the column defined by the outer diameters thereof tapers toward the tip thereof so that the tapered wound sheets 1 or reassemblies 7 in this case, too, fit well in the grooves 12. The grooves 12 may be U-shaped in section, as illustrated in FIG. 17.

In the embodiment illustrated in FIGS. 15 and 16, the jig 10' has a flat configuration. The base plate, i.e. jig body, 18 is provided with a plurality of U-shaped grooves 19; and just as in the preceding embodiment the grooves 19 are inclined in one direction. After the wound sheets 1 or the mandrel-sheet reassemblies 7 are fit into the grooves 19, clamping means in the form of a pressing plate 21, which is lined with an elastic material 20 such as rubber or an elastomeric synthetic resin, is placed thereon and manually fastened with bolts or bands. The grooves 19 may be V-shaped instead of U-shaped in section.

In the case of a reassembly 7, after complete hardening of the wound sheet 1 in the jig, the mandrel 2 is pulled out of the wound sheet 1 and the hollow tapered rod thus obtained is ground to a finished product.

As described above, the process according to the present invention comprises a step of pulling out the mandrel or thrusting the mandrel once pulled out again into the wound sheet when the wound sheet is semi-cured, that is, the sheet is hardened enough to be able to keep its tubular form even when the mandrel is pulled out but the impregnated synthetic resin is not yet fully cured; and a step of attaching the wound sheet or mandrel-sheet reassembly to a straightening jig for complete hardening. Thus, with no unfavorable stress developed between the inside of the sheet and the outside of the mandrel, all factors leading to a contraction and subsequent bending of the sheet can be eliminated. Moreover, use of a jig for the completion of hardening forcibly corrects any slight bending of the wound sheets which occurred in semi-curing and effects completion of the hardening of the wound sheets in a straight configuration, thereby yielding a large number of products at the same time with satisfactory quality.

With the use of the jig according to the present invention, completion of curing of a large number of products is simultaneously effected under the same curing conditions. When V- or U-section grooves are provided on the jig, a neat finish is readily imparted to the surface of the product due to the reduced area of contact thereof with the jig.

What I claim is:

1. A straightening jig for curing a plurality of wound semicured fiber-reinforced resin-impregnated sheets comprising a body having a surface with a plurality of grooves formed therein, the grooves being shaped so as partially to receive the wound sheets with a portion of each of the wound sheets protruding above the groove in which the wound sheet is partially received, and securing means for securing the wound sheets in the grooves said securing means including an elastromeric layer for pressing against said wound sheets.

2. A jig according to claim 1 adapted for said wound sheets being tapered, the depth of each of the grooves progressively increasing unidirectionally along the length of the groove for accommodation of the tapered configuration of the wound sheet received therein.

3. The jig of claim 1 wherein said grooves are V-Shaped in Cross-section.

4. The jig of claim 1 wherein said grooves are U-shaped in cross-section.

5. The jig of claim 1 wherein said securing means comprises a plurality of annular members each having an interior surface lined with said elastomeric material.

6. The Jig of claim 1 wherein said securing means comprises plural bands constituted of an elastomeric material.

7. The jig of claim 1 wherein said body is in the configuration of a rod, said grooves extending lengthwise of said rod, and being spaced at intervals around a peripheral surface of said rod.

8. A jig according to claim 1 in which said jig body is in the configuration of a plate and the grooves are arranged in a parallel array on a surface of the plate.

9. The jig of claim 8 wherein said securing means is a plate having an elastomeric material lining a face thereof.

* * * * *